Aug. 20, 1957 R. I. BRADLEY 2,803,137
WINDOWPANE THERMOMETER
Filed Dec. 22, 1953
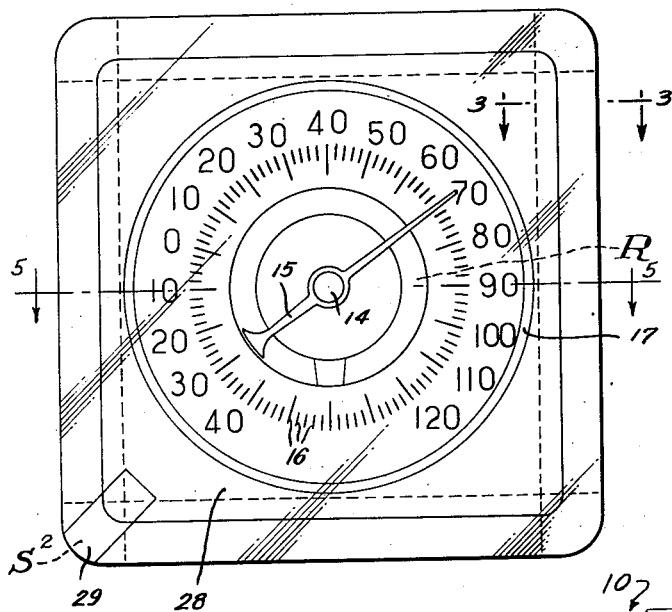
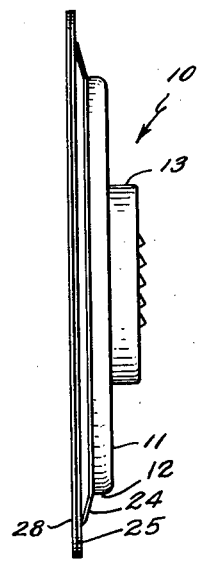
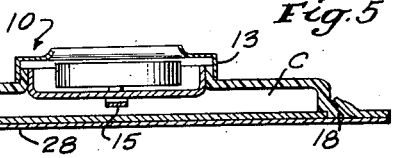
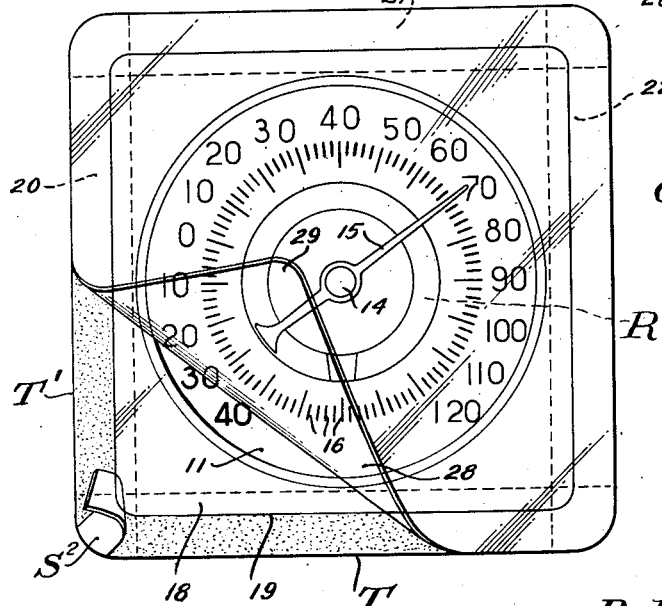
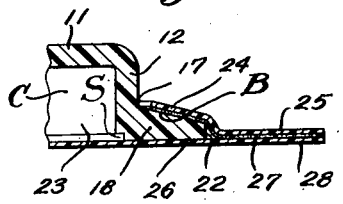
Inventor,
Robert I. Bradley,
by Roberts Cushman + Grover
Att'ys.

United States Patent Office 2,803,137
Patented Aug. 20, 1957

2,803,137

WINDOWPANE THERMOMETER

Robert I. Bradley, Belmont, Mass.

Application December 22, 1953, Serial No. 399,662

2 Claims. (Cl. 73—367)

This invention relates to windowpane thermometers such as are attached by adhesive directly to a windowpane, and more particularly to a thermometer of that type wherein a shallow container or box is arranged to register with an opening in a flat substantially rigid flange of transparent material to which the forward edge of the box is permanently fixed, either integrally as the result of a molding operation or by an adhesive bond, the box containing the pointer and the thermally responsive motor means by which the pointer is actuated. Heretofore, in applying the thermometer to the windowpane, the user had first to apply adhesive to the front surface of the flange, or, by the use of a solvent, activate an adhesive coating applied to the thermometer by the manufacturer, and then position it at the desired part of the windowpane and hold it in place until the adhesive had set sufficiently to support the thermometer. This mode of installing the thermometer presents some difficulties, especially when the window is so situated that the person applying the thermometer must do so by reaching out from the inside of the window, and in any event, requires care to prevent daubing the windowpane with surplus adhesive.

The present invention has for objects the provision of a thermometer of the above type which, when received by the user, has areas of a permanently tacky adhesive for use in attaching the thermometer to the windowpane, but having means for protecting the adhesive areas until just before the thermometer is installed. A further object is to provide a thermometer which, when received by the user, has areas of a weather-proof adhesive (which does not require the use of activating means to make it sticky) by means of which it may be attached to the windowpane, and wherein a readily removable protective element (which may also function to protect the mechanical parts of the thermometer from injury during shipment) acts to protect the adhesive areas until just before the thermometer is to be installed. Other and further objects and advantages of the invention will be pointed out in the following more detailed description and by reference to the accompanying drawings, wherein:

Fig. 1 is a front elevation of the thermometer of the present invention as it is delivered to the user;

Fig. 2 is an edge elevation of the thermometer of Fig. 1;

Fig. 3 is a fragmentary horizontal section on the line 3—3 of Fig. 1, but to larger scale, showing details of construction;

Fig. 4 is a front elevation, generally similar to Fig. 1, but indicating the step of removing the protective covering from the front of the thermometer in preparing it for application to the windowpane; and Fig. 5 is a section on the line 5—5 of Fig. 1.

Referring to the drawings, the numeral 10 (Fig. 2) designates a shallow container, here shown as of circular contour, comprising a forward portion having the flat annular rear wall 11 (Fig. 3) and the substantially cylindrical side wall 12, the walls 11 and 12 preferably being of a light-transmitting, desirably transparent, substantially rigid synthetic resin, for example, one of the vinyl resins. The container also comprises a rear part of smaller diameter than the forward part. This rear part may, for example, comprise an annular rib of the same material as and which is integral with the forward portion, and which may be closed at the rear by a sheet metal cap 13. The annular rib and the cap 13 define a chamber for housing the thermally responsive motor device which is operative to turn the staff 14 (Fig. 4) on which the pointer 15 is mounted. This pointer cooperates with a graduated scale 16 (Fig. 4) conveniently formed on the inner or forward flat face of the rear wall 11 of the front part of the container.

The forward edge 17 of the wall 12 of the container is permanently united (Fig. 3) preferably integrally (as by molding) to the rear surface of a rigid flange 18 of the same transparent material as that employed in making the forward part of the container 10.

As here illustrated, the flange 18 is of substantial thickness, for instance 1/16 inch, so that it may be sufficiently strong and rigid for its intended purpose. As illustrated, it is square in outline, having the substantially straight edges 19, 20, 21 and 22 (Fig. 4). This flange 18 is provided with a central aperture 23 (Fig. 3) here shown as circular, the wall 12 of the container preferably having a rabbet at S providing a shoulder at the forward margin of the aperture 23, which may form a support for a permanent front closure disk of transparent material, if desired. The flange 18 is here illustrated as having a beveled marginal rear surface B (Fig. 3) extending along each of its edges and to each of these beveled surfaces there is attached one marginal portion 24 of a strip of flexible tape T (Fig. 4), the attachment between the parts being of a permanent character and conveniently accomplished by the employment of a waterproof cement. The several strips T, T', etc., of this tape preferably overlap at the corners of the flange, the overlapping portions being adhesively united, thus forming a complete frame about the margin of the flange. The tape thus provided is desirably transparent, particularly if the flange 18 is transparent, and is of a thin, tough, flexible material, for example a suitable plastic which is not affected by the weather. Each of these strips of tape comprises a second marginal portion 25 (Fig. 3) which is so arranged that its forward face normally lies substantially in the plane of the flat forward face 26 of the flange 18. The forward surface of the marginal portion 25 of this tape is coated with an adhesive of a permanently tacky type and which is moisture-proof so that its adhesive qualities are not affected by exposure to the weather. Such so-called "pressure-sensitive" adhesives are now obtainable. If desired, this adhesive may cover the entire forward surface of the strip of tape, that portion of the adhesive which covers the part 24 of the tape being used for attaching the tape to the beveled surface B of the flange.

When the thermometer is delivered to the user, the forward face of the flange and the opening at the front of the chamber C in the container 11 is covered by a protective element 28. This protective element may desirably be a sheet of a suitable synthetic plastic and should be tough and tear-resistant, for example one of the vinyl resins or a cellulose derivative and desirably, although not necessarily, transparent. Preferably this sheet material is stiff enough so that it may bridge the open front portion of the cavity C in the container and thus protect the pointer and the parts contained within the container from mechanical injury or displacement. This protective element 28 is of a size to cover not only the front face of the flange 18 but also to extend out to the extreme edges of the strips of tape T, T', etc., the marginal portion of this protective element 28 adhering to the adhesive coating 27 on the front faces of the strips of tape. This protective element 28 thus protects the thermometer parts from injury during shipment, if no other front closure means is provided, and also protects the adhesive coating 27 from contact with exterior objects while the thermometer is being shipped to the user and up to the time at which the thermometer is to be applied to the windowpane. Desirably this sheet 28 is flexible so that it may be peeled away from the adhesive coating 27, as illustrated in Fig. 4. Sheet material of the kind above suggested, if of the order of 0.005" in thickness, has the requisite strength and desired flexibility. To facilitate the starting of this peeling operation, it is desirable to insert a separator element (indicated at S², Figs. 1 and 4) at a convenient point, for example, at one corner of the thermometer, between the adhesive coating and the inner or rear surface of the protective element 28. This separator may be a short strip of the same material which forms the tape T, T', etc. or any other suitable substance which is not penetrable by the adhesive coating 27. As shown in Fig. 1, this separator S² is introduced at one corner of the thermometer between the alhesive coating and the protector element 28, thus freeing the corner 29 of the protector element from the adhesive so that a fingernail may easily be inserted beneath the corner 29, thus facilitating the lifting of the corner 29 and the initiation of the operation of peeling the protector from the thermometer. Having removed the protecting element 28 in this way by peeling it off from the adhesive coating 27 on the tapes T, T', etc., the separator S² may then be removed and the adhesive coating 27 may be applied directly to the outer side of the windowpane. The operation of applying the thermometer in this manner merely requires that while holding the thermometer by its rear portion 13, for example, the user may shift the thermometer until it is located at the desired part of the windowpane and may then press the tacky coating 27 directly against the windowpane and by rubbing the rear side of the flexible tape the coating may thus be pressed firmly against the windowpane. By reason of the character of the coating an immediate and permanent adhesion is provided.

While one desirable embodiment of the invention has herein been shown and described by way of example, and while certain specific materials have been suggested as useful in the practice of the invention, it is to be understood that the invention is broadly inclusive of any and all modifications and substitutions of material which fall within the scope of the appended claims.

I claim:

1. In a thermometer, the combination of a shallow container, open at its front end having a flat rear surface, a peripheral wall whose inner surface is substantially perpendicular to said flat rear surface, the container being of rigid, light-transmitting material, a thermally responsive motor device mounted upon the outer face of said rear wall, a cap covering said motor device, a pointer within the container, the flat inner surface of the container having graduations for cooperation with the pointer, a staff on which the pointer is mounted said staff extending forwardly from the motor device through said rear wall and which is actuated by the thermally responsive motor device, the forward portion of the peripheral wall of the container having an internal rabbet in which is seated the edge of a transparent cover plate, a flange of strong rigid material extending outwardly from and fixed to the peripheral wall of the container, said flange having a flat forward face for contact with a windowpane, the flange also having a rear face which merges with the outer surface of the peripheral wall of the container, flexible tape having one margin in overlapping engagement with said rear surface of the flange and permanently secured thereto but which leaves the rear wall of the container and the box exposed, the opposite marginal portion of the tape being disposed substantially in the plane of the flat forward face of the flange and extending outwardly beyond the outer edge of the flange and carrying a coating of adhesive of the pressure-sensitive type for attaching the flange to the windowpane.

2. In a windowpane thermometer, the combination of: a rigid, shallow container housing a pointer, the container being open at its front and provided at its rear with means for housing a thermally responsive motor device for actuating the pointer, a substantially rigid flange of transparent material to whose rear side the forward edge of the container is permanently joined, the flange being rectangular in contour and the container being circular with its axis at the intersection of the diagonals of the flange, the flange having a beveled surface at its rear side along each edge, a length of flexible transparent waterproof tape extending along each edge of the flange, one margin of each length of tape being permanently joined to the corresponding beveled rear surface of the flange while the other margin of each tape extends outwardly beyond the outer edge of the flange and is disposed substantially in the plane of the front face of the flange, the forward surface of said latter margin of each tape having thereon a coating of moisture-resistant adhesive of the pressure-sensitive type for attaching the thermometer to the exterior of a windowpane, said adhesive allowing the attachment of a removable protective element designed to constitute a temporary closure for the front of the container.

References Cited in the file of this patent

UNITED STATES PATENTS

| | | |
|---|---|---|
| 332,535 | Jaeger | Dec. 15, 1885 |
| 2,030,135 | Carpenter | Feb. 11, 1936 |
| 2,235,252 | Bradley | Mar. 18, 1941 |
| 2,371,603 | Bradley | Mar. 20, 1945 |
| 2,490,933 | Tornquist et al. | Dec. 13, 1949 |
| 2,655,810 | La Coe | Oct. 20, 1953 |
| 2,688,430 | Brock | Sept. 7, 1954 |